(12) United States Patent
Hassine et al.

(10) Patent No.: US 9,268,592 B2
(45) Date of Patent: Feb. 23, 2016

(54) METHODS AND APPARATUS TO GENERATE A CUSTOMIZED APPLICATION BLUEPRINT

(71) Applicant: VMware, Inc., Palo Alto, CA (US)

(72) Inventors: Lital Hassine, Nes Ziona (IL); Asaf Kariv, Tel Mond (IL); Avshi Avital, Sde Warburg (IL)

(73) Assignee: VMware, Inc., Palo Alto, CA (US)

( * ) Notice: Subject to any disclaimer, the term of this patent is extended or adjusted under 35 U.S.C. 154(b) by 297 days.

(21) Appl. No.: 13/926,813

(22) Filed: Jun. 25, 2013

(65) Prior Publication Data

US 2014/0380308 A1    Dec. 25, 2014

(51) Int. Cl.
*G06F 9/455* (2006.01)

(52) U.S. Cl.
CPC .. *G06F 9/45558* (2013.01); *G06F 2009/45562* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 6,708,215 B1 | 3/2004 | Hingorani, et al. | |
| 7,805,419 B2 | 9/2010 | Newman | |
| 7,930,381 B2 | 4/2011 | Attanasio et al. | |
| 8,209,687 B2 * | 6/2012 | Yuyitung et al. | 718/1 |
| 8,448,170 B2 * | 5/2013 | Wipfel et al. | 718/1 |
| 8,620,851 B2 * | 12/2013 | Brown et al. | 706/52 |
| 8,789,022 B2 * | 7/2014 | Neogi | 717/126 |
| 8,874,704 B2 * | 10/2014 | Nath et al. | 709/220 |
| 8,914,768 B2 * | 12/2014 | Karnik et al. | 717/104 |
| 9,003,406 B1 * | 4/2015 | Hodge et al. | 718/1 |
| 9,015,712 B1 * | 4/2015 | Hodge et al. | 718/1 |
| 9,043,786 B1 * | 5/2015 | Hodge et al. | 718/1 |
| 9,047,133 B2 * | 6/2015 | Winterfeldt et al. | |
| 9,052,961 B2 * | 6/2015 | Mangtani et al. | |
| 2005/0203921 A1 | 9/2005 | Newman et al. | |
| 2008/0134175 A1 | 6/2008 | Fitzgerald et al. | |
| 2009/0144420 A1 | 6/2009 | Attanasio et al. | |
| 2011/0126207 A1 * | 5/2011 | Wipfel et al. | 718/104 |
| 2012/0066487 A1 * | 3/2012 | Brown et al. | 713/150 |
| 2012/0331388 A1 | 12/2012 | Nedelcu et al. | |
| 2014/0019597 A1 | 1/2014 | Nath et al. | |

FOREIGN PATENT DOCUMENTS

EP    2562973    2/2013

OTHER PUBLICATIONS

White Paper: "A Blueprint for Better Management from the Desktop to the Data Center", Feb. 2007, Novell, Inc., 17 pages.*
Hu et al. "JAVA Blueprint Procedure Pattern", 2013 IEEE, 5 pages.*
"Using VMware vFabric Application Director", VMware, Inc., vFabric Application Director 5.0, 2012 (164 pages).
"vCloud Director User's Guide", VMware, Inc., vCloud Director 5.1, 2010-2012 (126 pages).

(Continued)

*Primary Examiner* — Van Nguyen (57) ABSTRACT

Methods and apparatus to generate a customized application blueprint are disclosed. An example method includes determining a first virtual machine within an application definition, automatically identifying a property for the first virtual machine, and generating an application blueprint based on the identified property of the virtual machine.

25 Claims, 7 Drawing Sheets

(56) References Cited

OTHER PUBLICATIONS

"Infrastructure Navigator User's Guide", VMware, Inc., vCenter Infrastructure Navigator 2.0.0, 2012-2013 (38 pages).
Puppet Labs, "What is a Puppet?" <http://info.puppetlabs.com/download-pe.html>, 2014 (4 pages).
Puppet Labs, "Puppet Enterprise", <http://info.puppetlabs.com/download-pe.html>, 2014 (4 pages).
Mitchell, Dan, "DynamicOps Cloud Development Kit: Overview and Concepts: Extending Your Cloud to New Use Cases," DynamicOps.com, Jun. 2012, 12 pages.
Bourdeau, Rich, "DynamicOps Extensibility Overview: Enable, Adapt, and Extend your Infrastructure into a Business Relevant Cloud," DynamicOps.com, May 2012, 12 pages.
VMware, "vCloud Automation Center Introduced by VMware: vCloud Automation Center—leverages vCD to provision applications to virtual datacenters," retrieved from the internet on Nov. 30, 2012, 7 pages.
DynamicOps, "DynamicOps Cloud Automation Center Design Center Datasheet," DynamicOps.com, Apr. 12, 2011, webpage and linked datasheet, [retrieved on Mar. 27, 2014 at http://www.dabcc.com/article.aspx?id=17668], 6 pages.
VMware, "VMware vFabric™ Application Director," 2013, 2 pages.
VMware, "VMware vCenter Infrastructure Navigator," 2013, 1 page.
United States Patent and Trademark Office, "Non-Final Office Action," issued in connection with U.S. Appl. No. 14/191,020, Aug. 30, 2015, 26 pages.

* cited by examiner

METHODS AND APPARATUS TO GENERATE A CUSTOMIZED APPLICATION BLUEPRINT

FIELD OF THE DISCLOSURE

This disclosure relates generally to cloud computing and, more particularly, to methods and apparatus to generate a customized application blueprint.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

However, deployment tools currently in use are usually a homegrown patchwork of various software products from different vendors. Such tools are generally process-driven with heavy reliance on custom scripts and property files. Additionally, these tools often heavily utilize network bandwidth through continuous polling for readiness of execution or rely on a centralized mechanism that causes a central point of resource contention. Traditional deployment tools are also not configured for automation with cloud computing platforms that dynamically provision virtual computing resources.

BRIEF DESCRIPTION OF THE DRAWINGS

Wherever possible, the same reference numbers will be used throughout the drawing(s) and accompanying written description to refer to the same or like parts.

DETAILED DESCRIPTION

Many IT groups now have the need to move their traditional data centers and/or web applications to the cloud. The cloud can be private, public or hybrid. In order to do so they need to transfer multi-tier applications with a specific configuration to the cloud. The virtual infrastructure administrators are often not aware of all the configuration details that need to be customized or how to configure the applications components to work together.

Some applications are composed of mixtures of out-of-the-box (e.g., standard) components, such as software objects. The out-of-the-box components may be configured to interface, with common or standard types of modifications being applied to the components to make the overall application function as desired by the developer. In contrast, some applications and/or portions of applications require specialized modifications to the application components, interfaces, and/or virtual machines (VMs) hosting the application components (e.g., operating systems, virtual hardware, etc.).

While previous application management or lifecycle software may be capable of re-creating such customized configurations, the management or lifecycle software must be manually provided with the desired customizations and properties by a developer or administrator. Such manual provisioning of customizations limits the use of previous application management or lifecycle software to deployments of newly-defined applications and/or deployments of applications that must be manually re-created from a deployed application. Such re-creation results in a duplication of effort, is costly, and is subject to configuration errors and/or omissions of properties from the resources underlying the application, causing execution errors.

Example methods and apparatus disclosed herein facilitate the automatic conversion of unmanaged customized applications, including multiple VMs, to managed application deployments. Example methods and apparatus enable a deployed application to be imported to an application manager, such as vFabric Application Director, a commercially available product from VMware, Inc., from which the application can be managed. Example methods and apparatus use configuration discovery script(s) to scan deployed applications and/or application service packages. By scanning, example methods and apparatus disclosed herein identify customized application configuration properties of the application. Example methods and apparatus include the customized application configuration properties in the resulting application blueprint that describes the application. The application configuration properties are implemented upon deployment of the managed application based on the application blueprint.

Example methods and apparatus disclosed herein discover application properties by executing a discovery script via VM(s) implementing the application. For example, a VM may execute a discovery script to discover middleware settings stored in files, operating system registry keys, and/or any other source for implementing customized application configuration properties. Example customized application configuration properties include: dependencies between VMs, services, and/or other application components in the application; node cluster definitions; load balancing; port configurations; ciphers; custom drivers; and/or limits on simultaneous executing threads. Such items are easily overlooked when manually reviewing an application component's configuration. However, the example discovery scripts disclosed herein may be additionally or alternatively used to discover any other customized application configuration properties.

Examples disclosed herein provide deployment systems for deploying a multi-tier application to a cloud computing environment. Some example deployment systems enable a developer or "application architect" to create customized "application blueprints" from currently running or deployed applications. The application blueprints define the structure of the application, enable the use of standardized application infrastructure components, and specify installation dependencies and default configurations. The application blueprints define the topology for deployment in an infrastructure-agnostic manner to be portable across different cloud computing environments.

Example methods disclosed herein include determining a first virtual machine within an application definition, automatically identifying a property for the first virtual machine, and generating an application blueprint based on the property of the first virtual machine.

Example apparatus disclosed herein a service analyzer to identify a first virtual machine that is within an application definition, a virtual machine analyzer to identify a property for the first virtual machine, and an application blueprint generator to generate an application blueprint based on the property of the first virtual machine.

As used herein, the term "application component" refers to code (e.g., custom code) that has been packaged according to a format (e.g., as an archive format such as an enterprise archive (e.g., .ear file), a web archive (e.g., .war file), etc.).

As used herein, the term "node" or "logical node" refers to a VM or a cluster of VMs defined in a blueprint.

As used herein, the term "cluster" refers to a collection of hosts that can be managed as a single entity. The resources from the hosts in a cluster may be aggregated into a single pool. A cluster appears as a stand-alone host, but typically has more resources available.

As used herein, the term "blueprint" refers to a logical topology of an application for deployment. A blueprint captures the structure of an application with logical nodes, their corresponding services and operating systems, dependencies, default configurations, and network topology requirements.

As used herein, the term "cloud provider" refers to a cloud instance for deployment.

As used herein, the term "deployment environment" refers to an environment in a cloud provider. A deployment environment may be used, for example, for development, testing, staging, and/or production. A cloud provider can have multiple deployment environments.

As used herein, the term "catalog" refers to a library that contains logical templates (e.g., pointers to cloud templates). Catalogs provide one or more reusable services that can be used in multiple applications and installed on a VM. Catalogs may also provide tasks that perform additional customized functions in an application deployment.

As used herein, the term "logical template" refers to a predefined VM definition. A logical template can be mapped to an actual template in a cloud catalog. Logical templates allow an application blueprint to remain cloud agnostic.

As used herein, the term "service" refers to scripted software that can be installed on a VM and reused in multiple applications.

As used herein, the term "properties" refers to configuration variables used by scripts to set parameters on a script and run various configurations. For example, setting an installation_path property value causes installation scripts to use the property to specify the path to use to install a service during an application deployment process.

Figure 1:
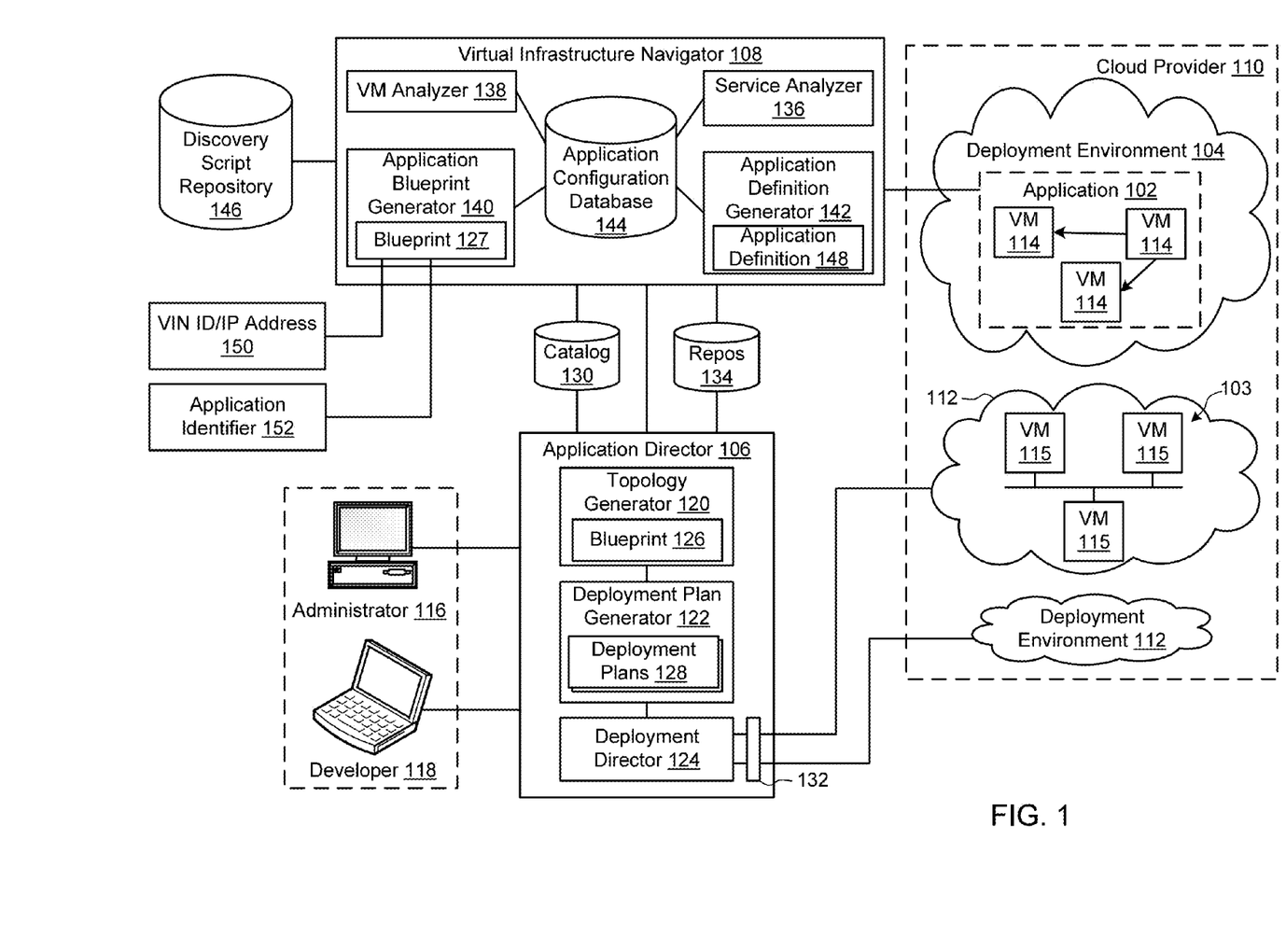
FIG. 1 depicts an example system constructed in accordance with the teachings of this disclosure for generating a customized application blueprint based on a deployed application.

FIG. 1 depicts an example system 100 for generating a customized application blueprint based on an unmanaged application 102 and constructed in accordance with the teachings of this disclosure. In the example of FIG. 1, the application 102 is a customized multi-tier application (e.g., modified from component templates) and is initially deployed in a deployment environment 104 in an unmanaged state (e.g., not managed via an application lifecycle package). The example system 100 includes an application director 106 and a virtual infrastructure navigator 108, which may be used to convert a customized application from an unmanaged state to a managed state (e.g., a managed application 103) and/or to manage applications as described in more detail below.

The example unmanaged application 102 is deployed in the deployment environment 104 provided by a cloud computing platform provider 110 (also referred to herein simply as a "cloud provider"). The example cloud computing platform provider 110 of FIG. 1 may include any number of deployment environments 104, 112.

The example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116 and/or the developer 118 may access services from the cloud computing platform provider 110, for example, via REST (Representational State Transfer) APIs (Application Programming Interface) and/or via any other client-server communication protocol. One particular implementation of a REST API for cloud computing services is vCloud Director API available from VMware, Inc. The example cloud computing platform provider 110 provisions virtual computing resources (e.g., the VMs 114) to provide the deployment environments 112 in which the administrator 116 and/or developer 118 can deploy multi-tier application(s). One particular example of a deployment environment that may be used to implement the deployment environments 112 of FIG. 1 is vCloud DataCenter cloud computing services available from VMware, Inc.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a blueprint 126 that specifies a logical topology of an application to be deployed. The example application director 106 may also import a blueprint 127 from the example virtual infrastructure navigator 108 for deployment and/or management. The example blueprints 126, 127 generally capture the structure of an application as a collection of application components executing on virtual computing resources. For example, the blueprint 126 generated by the example topology generator 120 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, comprised of application packages and their dependent middleware and operating systems. Applications may be distributed across multiple VMs. Thus, in the example described above, the term "application" refers to the entire online store application, including application server and database components, rather than just the web application itself.

The example blueprint 126 of FIG. 1 may be assembled from items (e.g., templates) from a catalog 130, which is a listing of available virtual computing resources (e.g., VMs, networking, storage) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 104 (e.g., IT or system administrator) that enters in specifications, configurations, properties, and/or other details about items in the catalog 130. Based on the application, the example blueprints 126, 127 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the application director 106 generates a deployment plan 128 based on the blueprint 126, 127 that includes deployment settings for the blueprint 126, 127 (e.g., virtual computing resources' cluster size, CPU, memory, networks) and an execution plan of tasks having a specified order in which virtual computing resources are provisioned and application components are installed, configured, and started. The example deployment plan 128 provides an IT administrator with a process-oriented view of the blueprint 126, 127 that indicates discrete steps to be performed to deploy the application. Different deployment plans 128 may be generated from a single blueprint 126, 127 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 115 provisioned from the deployment environment 112. Each VM 115 coordinates execution of each task with a centralized deployment module (e.g., the deployment director 124) to ensure that tasks are executed in an order that complies with dependencies specified in the application blueprint 126, 127.

The example deployment director 124 of FIG. 1 executes the deployment plan 128 by communicating with the cloud computing platform provider 110 via a cloud interface 132 to provision and configure the VMs 115 in the deployment environment 112. The example cloud interface 132 provides a communication abstraction layer by which application director 106 may communicate with a heterogeneous mixture of cloud provider 110 and deployment environments 112. The deployment director 124 provides each VM 115 with a series of tasks specific to the receiving VM 115 (herein referred to as a "local deployment plan"). Tasks are executed by the VMs 115 to install, configure, and/or start one or more application components. For example, a task may be a script that, when executed by a VM 115, causes the VM 115 to retrieve and install particular software packages from a central package repository 134. The example deployment director 124 coordinates with the VMs 115 to execute the tasks in an order that observes installation dependencies between VMs 115 according to deployment plan 128. After the application has been deployed, the application director 106 may be utilized to monitor and/or modify (e.g., scale) the deployment.

The virtual infrastructure navigator 108 of FIG. 1 generates the example application blueprint 127 based on the deployed application 102, which may be imported to the example application director 106 to be deployed and/or managed. To generate the application blueprint 127, the example virtual infrastructure navigator 108 of FIG. 1 includes a service analyzer 136, a VM analyzer 138, an application blueprint generator 140, an application definition generator 142, and an application configuration database 144. The example virtual infrastructure navigator 108 of FIG. 1 is in communication with a discovery script repository 146.

The example service analyzer 136 of FIG. 1 identifies the VMs 114 that are within an application definition 148. In some examples, the service analyzer 136 analyzes an application service package to identify the VMs 114 (e.g., VM name, VM IP address, VM host resource(s), etc.). In some other examples, the application definition generator 142 generates the application definition based on scans of the VMs 114 by the service analyzer 136 based on a seed VM 114.

The example service analyzer 136 receives a VM identifier (e.g., the VIN ID/IP address 150, and/or the application identifier 152 of FIG. 1).

The example service analyzer 136 of FIG. 1 receives (e.g., from the administrator 116) a VM identifier (e.g., a VIN ID) and/or an IP address 150 of a currently-running VM 114, from which the service analyzer 136 may iteratively determine VMs belonging to the application 102. The example service analyzer 136 analyzes the VM identifier 150 to determine, for example, IP addresses and/or credentials for the VM(s) 114. Additionally or alternatively, the example service analyzer 136 may receive an application identifier 152 for the application 102, such as a unique application name and an identifier of the deployment environment 104 in which the application 102 is deployed. The example service analyzer 136 of FIG. 1 may be required to translate the discovered properties into logical locations (e.g., IP addresses, URLs, URIs, etc.) at which the VM analyzer 138 may access the VMs 114 to perform analysis. The example service analyzer 136 of FIG. 1 identifies the VMs 114 from the VM identifier by, for example, querying the cloud computing platform provider 110. The service analyzer 136 of the illustrated example stores identifiers of the VMs 114 included in the application 102 in the application configuration database 144.

As mentioned above, the example service analyzer 136 may analyze the VMs 114 to facilitate generation of the application definition 148. For example, the service analyzer 136 of the illustrated example may access and/or execute the discovery script(s) in the discovery script repository 146 to discover properties such as dependencies, node cluster definitions, and/or interfaces to other, unidentified ones of the VMs 114 in the application 102. The example service analyzer 136 adds the discovered ones of the VMs 114 to a list of VMs to be analyzed by the VM analyzer 138 and provides any relevant configuration items to the example application definition generator 142. The example application definition generator 142 generates the application definition 148 based on the configurations and/or properties resulting from the configurations.

The example VM analyzer 138 of FIG. 1 identifies customized configurations (e.g., configuration items) for the identified VMs 114 in the application 102. For example, the VM analyzer 138 selects for analysis the VMs 114 that were identified by the service analyzer 136, defined in the application definition 148, and/or stored in the application configuration database 144. To analyze the example VMs 114, the example VM analyzer 138 of FIG. 1 selects and/or accesses discovery script(s) stored in the discovery script repository 146.

In the illustrated example, discovery scripts execute on the VM analyzer 138 and/or on the VMs 114 (e.g., using administrator credentials for the VMs 114) to discover configuration items of the VMs 114. For example, the VM analyzer 138 of FIG. 1 may execute the discovery script(s) to access the VM 114 via an interface (e.g., a command and/or text-based interface), through which the VM analyzer 138 may request and receive access to data elements (e.g., configurable items) of the VM 114. In some other examples, the VM analyzer 138 may transfer the discovery script(s) to the VM 114 for execution. The VM analyzer 138 of the illustrated example receives the configurations from the VM 114 (e.g., from communications by the executing discovery script(s)). The example VM analyzer 138 of FIG. 1 stores discovered configuration items in the application configuration database 144. In some examples, the VM analyzer 138 requests and/or executes a first discovery script in the discovery script repository 146, which results in calling additional discovery scripts based on the discovered configurations of the VMs 114.

In the example of FIG. 1, the VM analyzer 138 stores the discovered properties and configurations in association with data for respective ones of the VMs 114 such that the VMs 114 can be deployed by the application director 106 with the same respective configurations and/or properties to deploy a functionally identical version of the application 102.

In some examples, the discovery script(s) used by the service analyzer 136 to analyze and determine the application definition 148 are different than discovery script(s) used by the VM analyzer 138 to determine configurations of the VMs 114 for generating the application blueprint 127. For example, the service analyzer 136 calls a first discovery script to determine the application definition based on identification of a seed VM 114, and the VM analyzer 138 calls a second discovery script to obtain the configurations of the VMs 114 when the application definition 148 is generated (e.g., via running the first discovery script) and/or when the application definition is determined from an application service package (e.g., a WAR file).

The example application blueprint generator 140 of FIG. 1 generates the application blueprint 127 based on the identified configurations of the VMs 114 in the application 102. The application blueprint generator 140 of FIG. 1 converts or translates the configuration items (e.g., configurable data elements in the VMs 114) to properties (e.g., variables to be used by scripts to set parameters on a script and run various configurations during deployment) for inclusion in the application blueprint 127. The example application blueprint generator 140 generates the application blueprint 127 to be substantially identical to an application blueprint that would be generated manually by an administrator 116 or developer 118 by selecting logical templates and/or customizing properties via the topology generator 120.

In the example of FIG. 1, the application blueprint generator 140 accesses the application configuration database 144 to select a VM 114 that was analyzed by the VM analyzer 138. The example application blueprint generator 140 of the illustrated example determines logical template(s) that may be used to implement the selected VM 114 and/or services executing on the selected VM 114 as part of the application 102. The example application blueprint generator 140 of FIG. 1 populates the blueprint 126 with the selected template(s). The application blueprint generator 140 then determines customized properties based on the discovered configuration items of the VM 114 (e.g., configuration items stored in the application configuration database 144 by the VM analyzer 138) and applies the same and/or corresponding customized properties to the respective application components (e.g., logical templates) in the blueprint 126. When the application components (e.g., logical templates) have been customized by the example application blueprint generator 140 of the illustrated example, the example application components in the blueprint 126 are configured such that the example application director 106 may deploy a VM 115 in the managed application 103 to provide the same components and/or services of the application 102 as the VM 114 that was analyzed by the VM analyzer 138.

In the example of FIG. 1, the example VM analyzer 138 identifies any customized configuration elements of the VMs 114 that may be implemented manually via the topology generator 120. Example configuration elements that may be discovered by the VM analyzer 138 (e.g., via the discovery scripts) and implemented in the blueprint 126 include: dependencies between the VMs 114, services, and/or other application components in the application 102; node cluster definitions; load balancing; port configurations; ciphers; custom drivers; and/or limits on simultaneous executing threads. However, the example VM analyzer 138 may execute the discovery scripts to discover any other customized application configuration elements. For example, the VM analyzer 138 may execute the discovery scripts to discover configurations stored on the VM 114 in files, operating system registry keys, and/or any other source for implementing customized application configurations. When the application blueprint generator 140 of the illustrated example has processed each of the VMs 114 analyzed by the VM analyzer 138, the example application blueprint 127 of FIG. 1 is representative of the customized application 102 of FIG. 1, including configurations of the VMs 114, and may be deployed by the application director 106 to a deployment environment 112 as a managed application 103.

Figure 2:
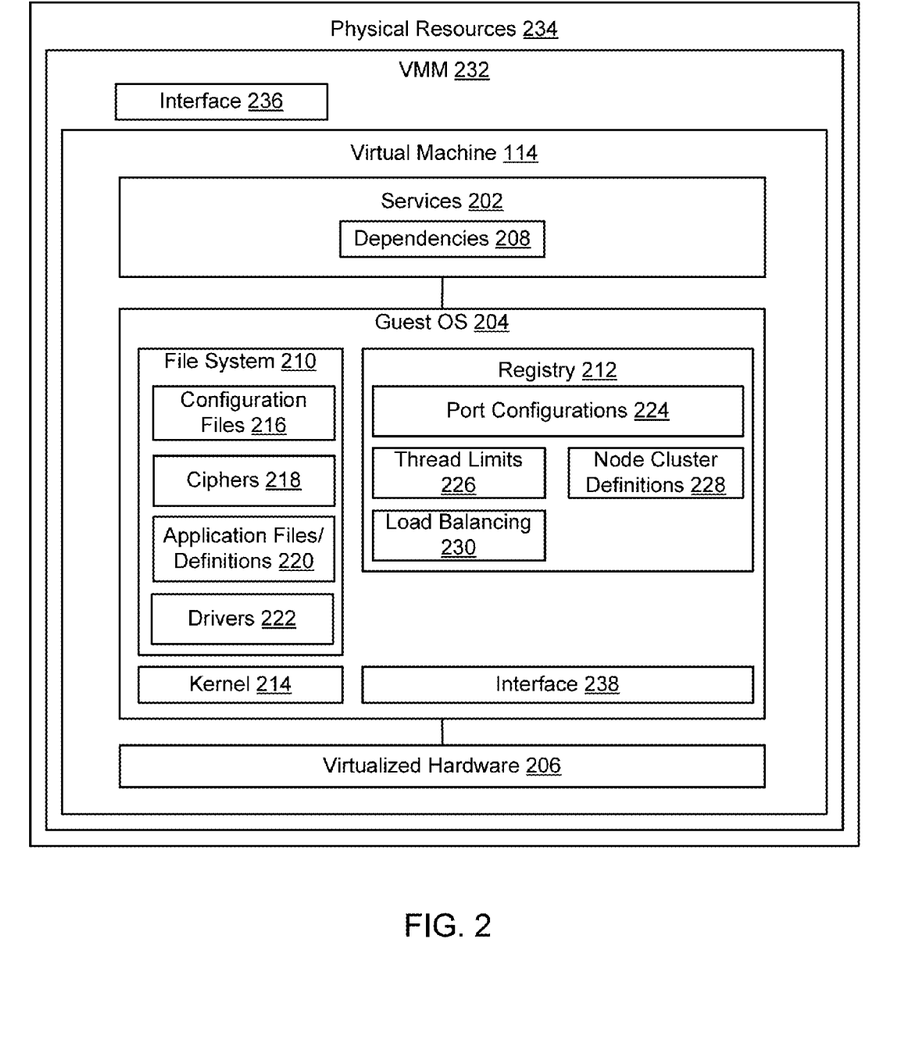
FIG. 2 is a block diagram of an example virtual machine (VM) that may be analyzed by the example system of FIG. 1 to create a customized application blueprint.

FIG. 2 is a block diagram of an example implementation of the VM 114 of FIG. 1. The example VM 114 of FIG. 2 may be analyzed by the example system 100 of FIG. 1 (e.g., via the VM analyzer 138 and/or discovery scripts) to create a customized application blueprint 127. The example VM 114 executes a set of services 202 and a guest OS 204 on virtualized hardware 206.

The example services 202 of FIG. 2 may include one or more dependencies 208 (e.g., dependencies on other services, dependencies on services executing on other VMs in the application, etc.). The dependencies 208 may include, for example, input data and/or confirmation of performance of another task prior to execution of a task by the services 202.

The example guest OS 204 of FIG. 2 includes a file system 210, a registry 212, and a kernel 214. The example file system 210 includes configuration files 216, ciphers 218, application files/definitions 220, and custom drivers 222. The example registry 212 of FIG. 2 includes communication port configurations 224, thread limits 226, node cluster definitions 228, and load balancing settings 230. However, the example configuration items 216-230 may be included in and/or divided among any of the virtual components 202-206, 210-214.

To identify properties of the example VM 114, the example VM analyzer 138 of FIG. 1 accesses a virtual machine manager (VMM) 232 that manages the execution of the VM 114 (and other VMs) on physical resources 234. In some examples, the VM analyzer 138 is provided with credentials (e.g., a user name and password of a user or administrator authorized to access the relevant portions of the VM 114) to access the components and/or properties 202-230 via a communications interface 236 of the VMM 232 and/or a communications interface 238 of the VM 114 (e.g., when the VM 114 is executing on the physical resources 234. For example, the VM analyzer 138 may issue text-based commands to the VM 114 to access data from the file system 210, the registry 212, and/or the kernel 214.

The example file system 210, the example registry 212, the example kernel 214, the example configuration files 216, the example ciphers 218, the example application files/definitions 220, the example custom drivers 222, the example communication port configurations 224, the example thread limits 226, the example node cluster definitions 228, and the example load balancing settings 230 of FIG. 2 are virtualized components. In some examples, the VM analyzer 138 (e.g., via executing discovery scripts) accesses data representative of the VM 114 (e.g., a stored VM file, a VM suspended state or snapshot state file, a virtual memory file, etc.) to identify the properties from the VM components 202-230. The example VM 114 may access the data representative of the VM 114 via the VMM 232 (e.g., via the interface 236) and/or via the physical resources 234 (e.g., in a physical storage device or memory).

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example VM 138, the example application blueprint generator 140, the example application definition generator 142, the example application configuration database 144, the example discovery script repository 146, the example application definition 148 and/or, more generally, the example system 100 of FIG. 1 may be implemented by hardware, software, firmware and/or any combination of hardware, software and/or firmware. Thus, for example, any of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example VM 138, the example application blueprint generator 140, the example application definition generator 142, the example application configuration database 144, the example discovery script repository 146, the example application definition 148 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example VM 138, the example application blueprint generator 140, the example application definition generator 142, the example application configuration database 144, the example discovery script repository 146, and/or the example application definition 148 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Figure 3:
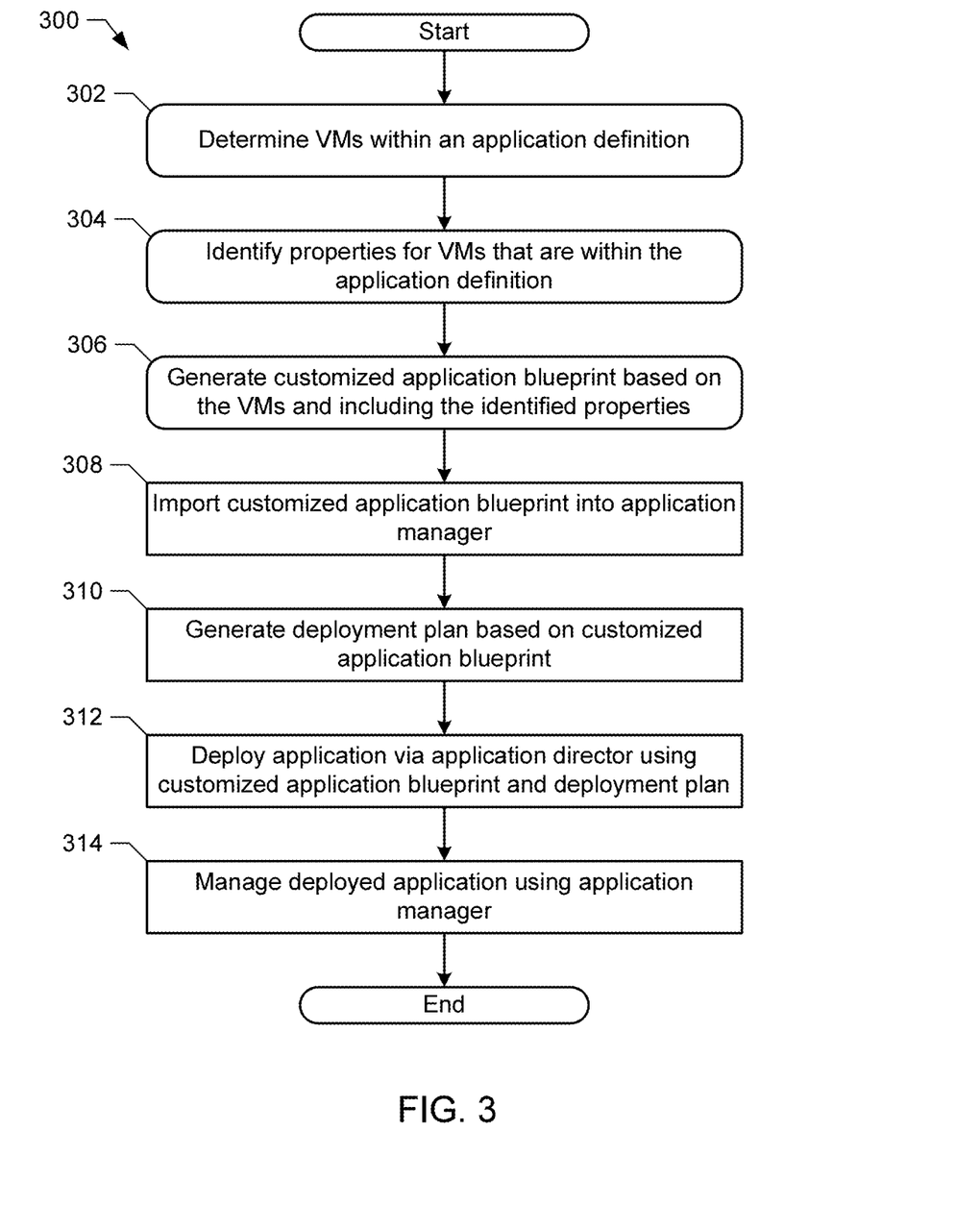
FIG. 3 is a flowchart representative of example machine readable instructions which may be executed to implement the example system of FIG. 1 to generate and deploy a customized application blueprint.
Figure 4:
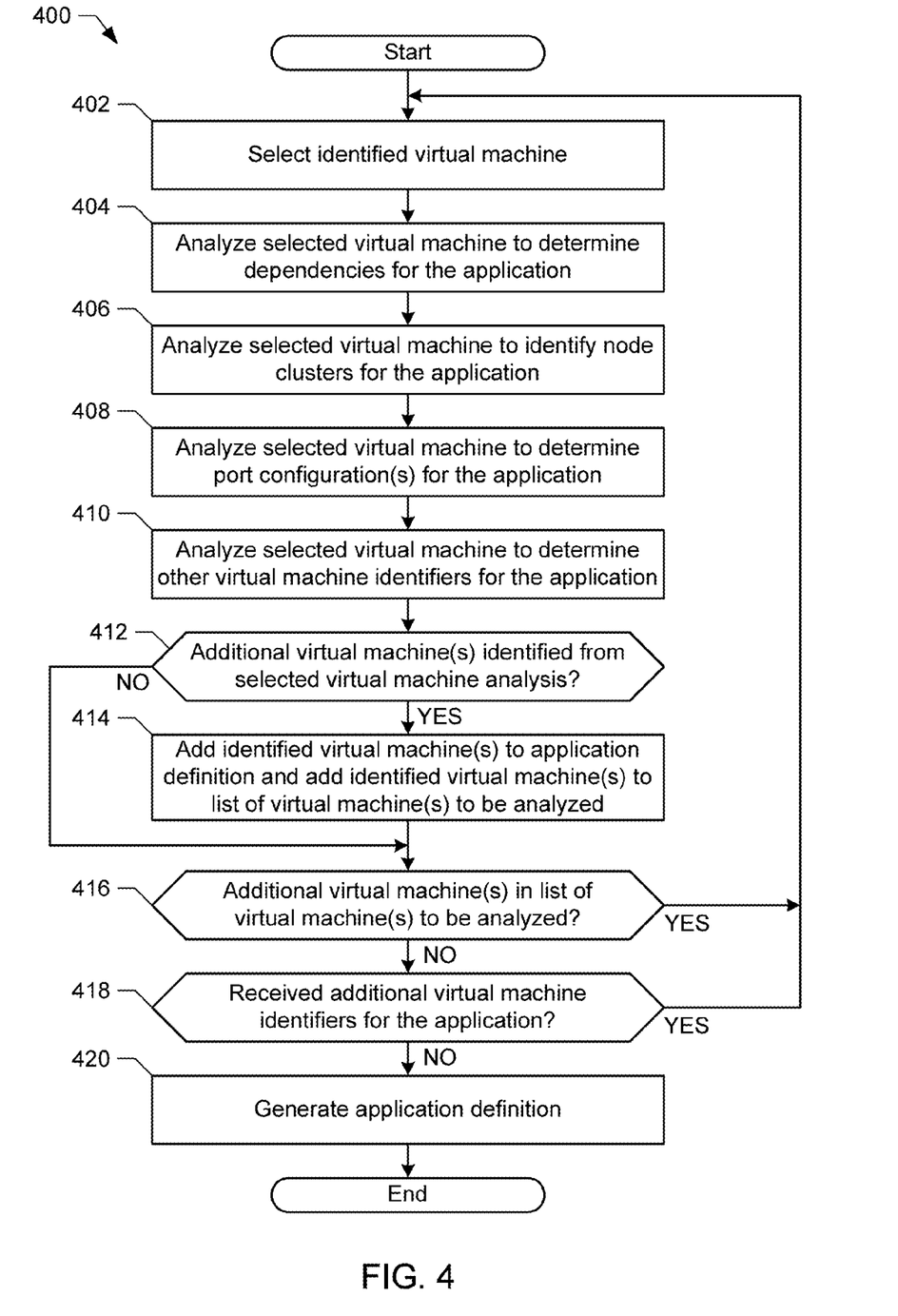
FIG. 4 is a flowchart representative of example machine readable instructions which may be executed to implement the example service analyzer of FIG. 1 to determine VMs in an application definition.
Figure 5:
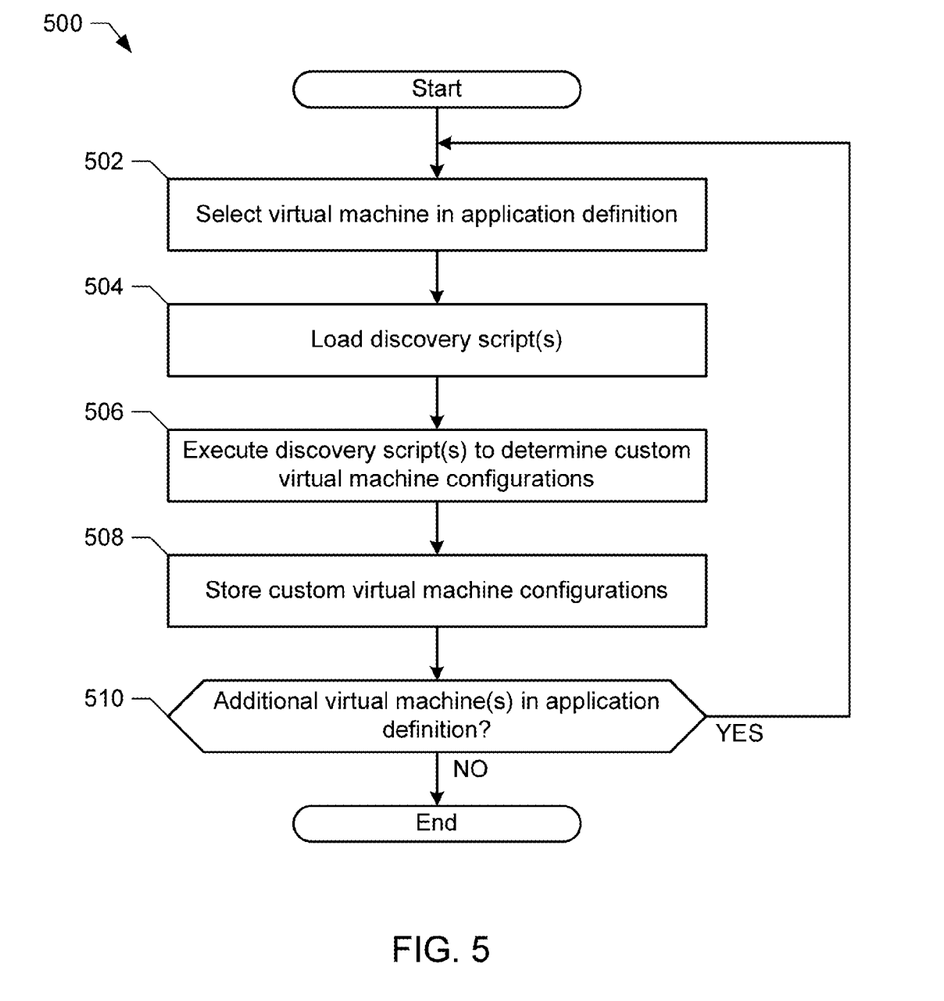
FIG. 5 is a flowchart representative of example machine readable instructions which may be executed to implement the example VM analyzer of FIGS. 1 and/or 2 to identify properties for VMs that are within an application definition.

Flowcharts representative of example machine readable instructions for implementing the system 100 of FIG. 1 is shown in FIGS. 3, 4, 5, and/or 6. In this example, the machine readable instructions comprise programs for execution by a processor such as the processor 712 shown in the example processor platform 700 discussed below in connection with FIG. 7. The programs may be embodied in software stored on a tangible computer readable storage medium such as a CD-ROM, a floppy disk, a hard drive, a digital versatile disk (DVD), a Blu-ray disk, or a memory associated with the processor 712, but the entire programs and/or parts thereof could alternatively be executed by a device other than the processor 712 and/or embodied in firmware or dedicated hardware. Further, although the example programs are described with reference to the flowchart illustrated in FIGS. 3-6, many other methods of implementing the example system 100 may alternatively be used. For example, the order of execution of the blocks may be changed, and/or some of the blocks described may be changed, eliminated, or combined.

As mentioned above, the example processes of FIGS. 3-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 3 is a flowchart representative of example machine readable instructions 300 which may be executed to implement the example system 100 of FIG. 1 to generate and deploy a customized application blueprint 127.

The example instructions 300 of FIG. 3 begin by determining VMs (e.g., the VMs 114 of FIG. 1) within an application definition of the application 102 (e.g., the application definition 148 of FIG. 1) (block 302). For example, the service analyzer 136 may identify the VMs 114 within the application 102 of FIG. 1 by analyzing one or more of the VMs 114 and/or based on an application service package. Example instructions to implement block 302 are described below with reference to FIG. 4.

The example VM analyzer 138 identifies properties for the VMs 114 that are within the application definition 148 (block 304). For example, the VM analyzer 138 may access and execute discovery scripts stored in the discovery script repository 146 of FIG. 1 to identify configurations of the VMs 114 of the application 102. The example application blueprint generator 140 converts or translates the configurations (e.g., configuration items) to properties. Example configuration items that may be discovered by the example VM analyzer 138 include middleware settings stored in files, operating system registry keys, and/or any other source(s) for implementing customized application configurations. Example configuration items include: dependencies between VMs, services, and/or other application components in the application; node cluster definitions; load balancing; port configurations; ciphers; custom drivers; and/or limits on simultaneous executing threads.

The example VM analyzer 138 may discover the properties by, for example, executing the discovery script(s) to access the VMs 114 while they are executing on physical resources (e.g., the physical resources 234 of FIG. 2) and/or to access data representative of the VMs 114 while the VMs 114 are not executing (e.g., while the VMs 114 are suspended). Example instructions to implement block 304 are described below with reference to FIG. 5.

The example application blueprint generator 140 of FIG. 1 generates a customized application blueprint 127 based on the VMs 114 and including the properties identified by the example VM analyzer 114 (block 306). For example, the application blueprint generator 140 may populate the customized application blueprint 127 using logical templates (e.g., from the catalog 130 of FIG. 1) based on the services provided by corresponding ones of the VMs 114. The example application blueprint generator 140 then customizes the logical templates using the identified properties to copy the functionality of the VMs 114 in the application 102. Example instructions to implement block 306 are described below with reference to FIG. 6.

The example application director 106 of FIG. 1 imports the customized application blueprint 127 (block 308). For example, the application director 106 may load a WAR file or other type of application blueprint file. The example deployment plan generator 122 generates a deployment plan (e.g., the deployment plan(s) 128 of FIG. 1) based on the customized application blueprint (block 310). The example deployment director 124 deploys the application 103 in a managed deployment environment (e.g., the deployment environments 112 of FIG. 1) using the customized application blueprint 127 and the deployment plan(s) 128. The example deployment director 124 manages the deployed application 103. For example, the administrator 116 of FIG. 1 may monitor and/or modify the deployed application 103 via the deployment director 124. The example instructions 300 then end. In some examples, management of the deployed application in block 314 may be ongoing after application 103 has been deployed via the deployment director 124.

FIG. 4 is a flowchart representative of example machine readable instructions 400 which may be executed to implement the example service analyzer 136 of FIG. 1 to determine VMs in an application definition. The example instructions 400 of FIG. 4 may be executed to implement block 302 of FIG. 3.

The example service analyzer 136 of FIG. 1 selects an identified VM 114 (block 402). For example, the service analyzer 136 may be provided with an identification (e.g., the VIN ID/IP address 150 of FIG. 1) of a first VM 114 in the application 102 as a seed VM.

The example service analyzer 136 analyzes the selected VM 114 to determine dependencies for the application 102 (block 404). For example, the service analyzer 136 may determine other service(s) and/or VMs 114 on which services operating on the selected VM 114 depend.

The example service analyzer 136 analyzes the selected VM 114 to identify node clusters for the application (block 406). For example, the selected VM 114 may be configured in a cluster of VMs 114 that are part of the application 102.

The example service analyzer 136 of FIG. 1 analyzes the selected VM 114 to determine port configuration(s) for the application (block 408). For example, the VMs 114 in the application 102 may be configured to communicate with other ones of the VMs 114 at different IP addresses via designated ports. By identifying the port configuration(s), the example service analyzer 136 may obtain the IP addresses and/or identifiers of other VMs 114 in the application 102.

The example service analyzer 136 of FIG. 1 analyzes the selected VM 114 to determine other VM identifiers for the application 102 (block 410). For example, the service analyzer 136 may analyze any other configuration items of the VMs 114 in the application 102 from which additional VMs 114 in the application 102 may be identified.

The example service analyzer 136 of FIG. 1 determines whether additional VMs 114 have been identified from analysis of the selected VM (block 412). If VMs have been identified (block 412), the example service analyzer 136 adds any identified (e.g., newly-identified) VMs 114 to a list of VMs to be analyzed (block 414). The list of VMs to be analyzed may be used by the example service analyzer 136 to identify further VMs 114 in the application 102 and/or by the VM analyzer 138 of FIG. 1 to identify the configurations of the VMs 114.

After adding identified VMs 114 to the list (block 414), or if no additional VMs have been identified by analyzing the selected VM (block 412), the example service analyzer 136 determines whether additional VMs in the list of VMs are to be analyzed (block 416). If there are no additional VMs to be analyzed by the service analyzer 136 (block 416), the example service analyzer 136 determines whether another VM identifier (e.g., another VM seed) has been received for the application 102 (block 418). For example, if there are additional VMs 114 in the application 102 that were not identified by the service analyzer 136 by analyzing a first seed VM 114, the example administrator 116 (or another user) may seed an additional VM identifier to the service analyzer 136 to continue identifying the VMs 114 in the application 102. If there are additional VMs 114 in the list (block 416) or if another VM identifier has been received (block 418), control returns to block 402 to select another VM 114 (e.g., from the list or based on a received VM seed).

When there are no additional VMs 114 in the list (block 416) and another VM identifier has not been received (block 418), the example application definition generator 142 of FIG. 1 generates an application definition 148 (block 420). For example, the application definition generator 142 may generate the application definition 148 for the application 102 based on a list of VMs identified by the service analyzer 136 and VMs seeded to the example service analyzer 136. The example instructions 400 then end and control returns to block 304 of FIG. 3.

FIG. 5 is a flowchart representative of example machine readable instructions 500 which may be executed to implement the example VM analyzer 138 of FIG. 1 to identify properties for VMs 114 that are within an application definition 148. The example instructions 500 of FIG. 5 may be executed to implement block 304 of FIG. 3. The example instructions 500 begin when an application definition 148 has been obtained (e.g., received and/or generated).

The example VM analyzer 138 of FIG. 1 selects a VM in the application definition 148 (block 502). For example, the application definition 148 may list identifiers, URLs, URIs, and/or any other uniquely identifying information for the VMs 114 in the application 102 of FIG. 1. The example VM analyzer 138 loads discovery scripts (block 504). For example, the VM analyzer 138 may access the discovery script repository 146 of FIG. 1 to load one or more discovery scripts, which in turn may call additional discovery scripts during execution by the VM analyzer 138. In some examples, the VM analyzer 138 loads a discovery script based on a type or function of the selected VM 114.

The example VM analyzer 138 of FIG. 1 executes the discovery script(s) to determine custom VM configurations (block 506). For example, the VM analyzer 138 may execute the discovery script(s) to access the example file system 210, the example registry 212, and/or the example kernel 214 to identify configuration files 216, ciphers 218, application files/definitions 220, custom drivers 222, communication port configurations 224, thread limits 226, node cluster definitions 228, load balancing settings 230, and/or other properties of the VM 114. For example, the discovery script may be executed to access the interface 238 of the VM 114 and/or the interface 236 of the VMM 232 of FIG. 2. In some other examples, the VM analyzer 138 loads the discovery scripts onto the selected VM 114 and/or the VMM 232 of FIG. 2 to discover and provide the configurations to the VM analyzer 138. The example VM analyzer 138 stores the identified custom VM configurations (e.g., configuration items) (block 508). For example, the VM analyzer 138 may store the VM properties in the example application configuration database 144.

The example VM analyzer 138 determines whether there are additional VMs 114 in the application definition 148 to be analyzed (block 510). If there are additional VMs 114 to be analyzed (block 510), control returns to block 502 to select another VM 114. When there are no more VMs 114 to be analyzed for custom configurations (block 510), the example instructions 500 of FIG. 5 end and control returns to block 306 of FIG. 3.

Figure 6:
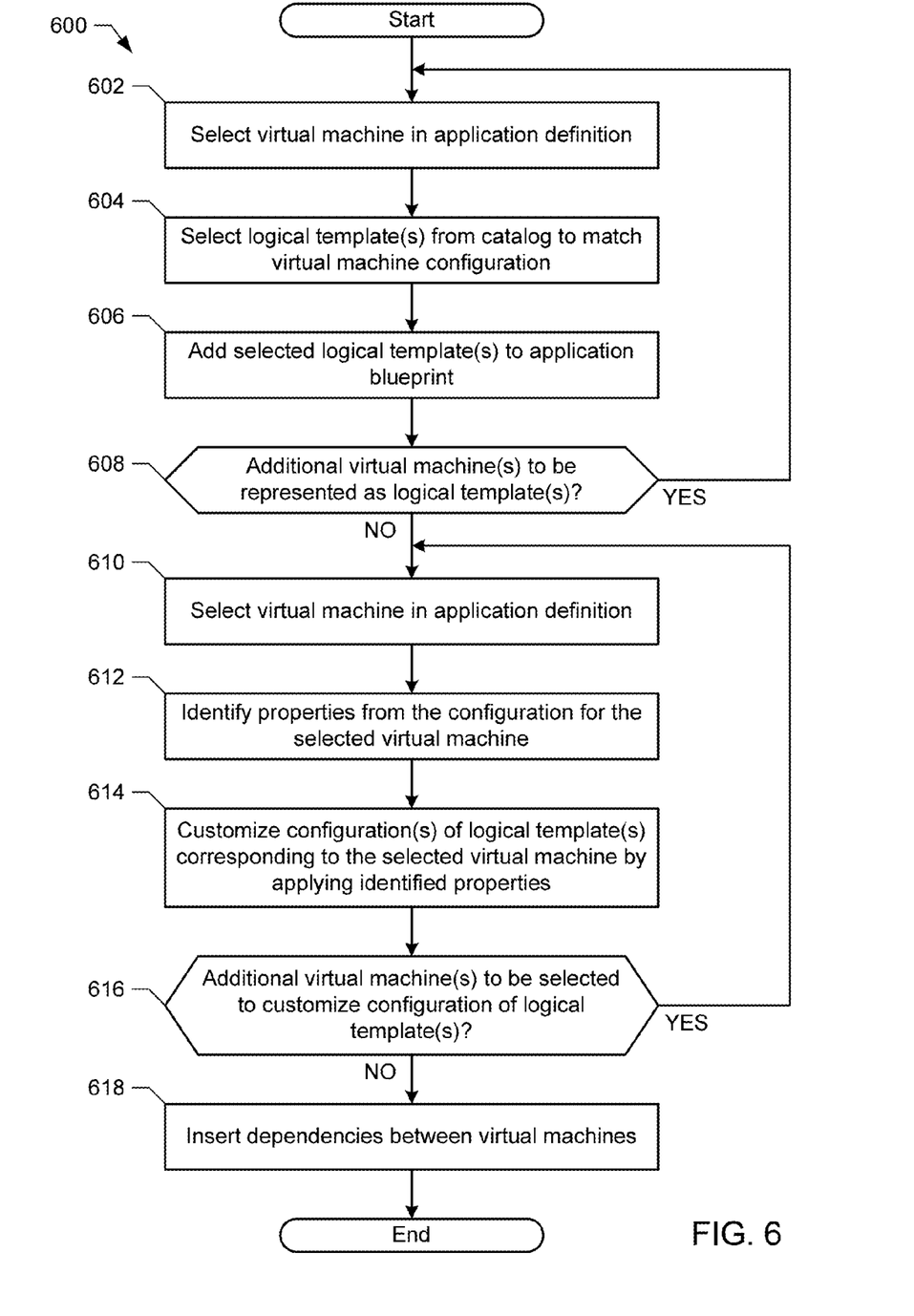
FIG. 6 is a flowchart representative of example machine readable instructions which may be executed to implement the example application blueprint generator of FIGS. 1 and/or 2 to generate a customized application blueprint.

FIG. 6 is a flowchart representative of example machine readable instructions 600 which may be executed to implement the example application blueprint generator 140 of FIG. 1 to generate a customized application blueprint 127. The example instructions 600 of FIG. 6 may be executed to implement block 306 of FIG. 3.

The example application blueprint generator 140 of FIG. 1 selects a VM 114 in the application definition (block 602). The application blueprint generator 140 selects a logical template from a catalog (e.g., the catalog 130 of FIG. 1) to match the VM configuration (block 604). For example, the application blueprint generator 140 selects one or more logical templates from the catalog 130 to represent the services, operating systems, and/or hardware associated with the selected VM 114 (e.g., the services 202 of FIG. 2). In the example block 604, the example application blueprint generator 140 matches an unmodified or out-of-the-box version of the service(s) 202, guest OS 204, and/or virtual hardware 206 identified for the selected VM 114. The unmodified or out-of-the-box versions may be stored in the example application configuration database 144 of FIG. 1 by the example VM analyzer 138. For example, the VM analyzer 138 may identify and store type(s) and/or version(s) of the service(s) 202, guest OS 204, and/or physical hardware 206 of FIG. 2 in addition to identifying customized configurations of the example VM 114.

The example application blueprint generator 140 adds the selected logical template(s) to the application blueprint 127 (block 606). For example, the application blueprint generator 140 may add the logical templates to a container or other data structure representative of a VM 114 to be included in a deployment of the application 102.

The example application blueprint generator 140 determines whether additional VM(s) are to be represented as logical template(s) (block 608). If additional VMs are to be represented as logical template(s) (block 608), control returns to block 602 to select another VM in the application definition 148.

When each of the example VMs have been represented in the application blueprint 127 as logical template(s) (block 608), the example application blueprint generator 140 re-processes each of the VMs 114 in the application definition 148 to customize the properties of the VMs 115 in the application blueprint 127 based on the discovered configurations (e.g., configuration items, configuration settings, etc.) of the VMs 114. The example application blueprint generator 140 selects a VM in the application definition (block 610). The VM 114 selected in block 610 is a VM 114 that was previously selected during an iteration of block 602.

The example application blueprint generator 140 identifies properties for the selected VM 114 based on the configuration of the VM 114 (block 612). For example, the application blueprint generator 140 may convert configuration items identified by the example VM analyzer 138 for the selected VM 114 to properties to be used by the application director 106 when deploying the application 103 and the VMs 115. The application blueprint generator 140 of the illustrated example customizes the configuration(s) (e.g., properties) of the logical template(s) (e.g., application components) in the blueprint 127 corresponding to the selected VM 114 by applying the identified (e.g., resulting) properties (block 614). For example, the application blueprint generator 140 of FIG. 1 modifies the logical template(s) for the selected VM 114 by modifying the example file system 210, the example registry 212, the example kernel 214 to customize configuration files 216, ciphers 218, application files/definitions 220, custom drivers 222, communication port configurations 224, thread limits 226, node cluster definitions 228, load balancing settings 230, and/or other properties of the logical templates and/or application components for the selected VM 114. The resulting application components provide identical or substantially identical services to the selected VM 114.

The example application blueprint generator 140 of FIG. 1 determines whether additional VMs 114 are to be selected to customize the configuration of the logical template(s) and/or application component(s) (block 616). If there are additional VMs to be selected to customize the appropriate logical template(s) and/or application component(s) (block 616), control returns to block 610 to select another VM 114. When there are no more VMs to be selected (block 616), the example application blueprint generator 140 inserts any dependencies between the VMs 114 in the application 102 (block 618). For example, the application blueprint generator 140 may wait to insert the dependencies until the application components corresponding to the VMs 114 are customized with the appropriate properties. While the dependencies may be identified and/or stored using temporary identifiers of the analyzed VMs 114, the example customized properties may result in modifying the identifiers of the example application components such that previously-configured dependencies may be broken.

Furthermore, some dependencies may be based on logical location(s) of the deployed VMs 114 rather than identifiers of the VMs 114. Accordingly, the example application blueprint generator 140 may generate a separate data structure in the application blueprint 127 that identifies the dependencies between application components in the blueprint 127. The example deployment plan generator 122 may generate the deployment plan 128 by converting the dependencies to logical locations. In some other examples, the application blueprint generator 140 inserts the dependencies during block 614 when customizing the configuration(s) of the logical templates (e.g., subsequent to adding logical template(s) and/or application components to the application blueprint). After inserting the dependencies (block 620), the example instructions 600 end and control returns to block 308 of FIG. 3.

Figure 7:
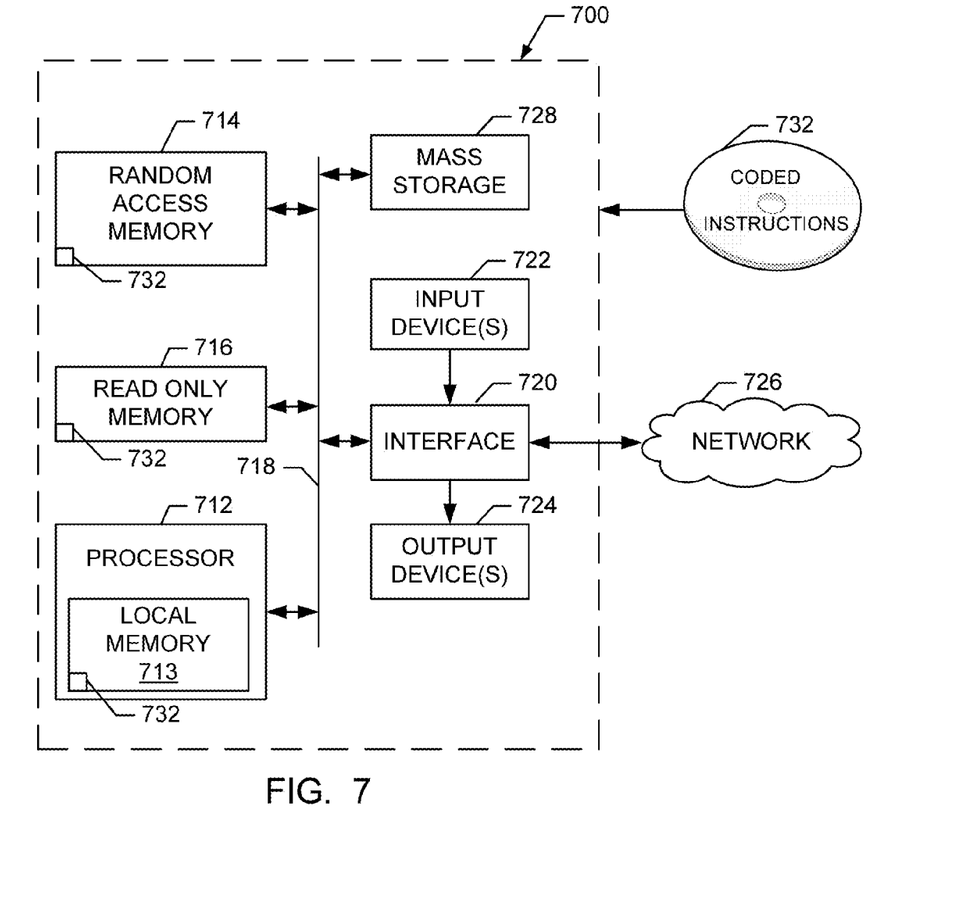
FIG. 7 is a block diagram of an example processor platform capable of executing the instructions of FIGS. 3, 4, 5, and/or 6 to implement the system of FIG. 1.

FIG. 7 is a block diagram of an example processor platform 700 capable of executing the instructions of FIGS. 3, 4, 5, and/or 6 to implement the application director 106 and/or the virtual infrastructure navigator 108 of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-6 may be stored in the mass storage device 728, in the volatile memory 714, in the non-volatile memory 716, and/or on a removable tangible computer readable storage medium such as a CD or DVD.

As mentioned above, example methods and apparatus disclosed herein facilitate the automatic conversion of unmanaged customized applications including multiple VMs to managed application deployments. Example methods and apparatus disclosed herein enable application deployments to the cloud in a manner that is faster, less expensive, and less prone to errors caused by manual entry of application properties. Furthermore, example methods and apparatus enable a more accurate analysis of the properties and configurations of VMs in an application by automating the VM analysis process, thereby enabling application deployments that accurately reflect the original, unmanaged application. The foregoing advantages enable enterprises to more readily take advantage of cloud computing and Infrastructure-as-a-Service to implement customized web applications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
generating, by executing an instruction with a processor, an application definition of an unmanaged application by identifying a first virtual machine as being part of the unmanaged application based on a configuration of a second virtual machine;
executing a script with the processor to automatically identify a first property for the first virtual machine by accessing a first interface of the first virtual machine and to automatically identify a second property of the first virtual machine by accessing a second interface of a virtual machine manager corresponding to the first virtual machine;
generating, by executing an instruction with the processor, an application blueprint, the application blueprint generated by adding a logical template corresponding to the first virtual machine to the application blueprint and modifying the logical template based on the first property and the second property of the first virtual machine; and
deploying, by executing an instruction with the processor, a managed application according to the application blueprint to implement the unmanaged application.

2. A method as defined in claim 1, wherein the deploying of the managed application includes deploying a third virtual machine based on the application blueprint.

3. A method as defined in claim 1, wherein the first property of the first virtual machine includes a middleware setting.

4. A method as defined in claim 1, wherein the first property is automatically identified by identifying a configuration item in the first virtual machine and translating the configuration item to the first property.

5. A method as defined in claim 4, wherein the identifying of the configuration item includes executing a discovery script to access data from the first virtual machine.

6. A method as defined in claim 4, wherein the configuration item includes at least one of: (1) a dependency between the first virtual machine and at least one of (a) a third virtual machine, (b) a service, or (c) another application component in the unmanaged application; (2) a node cluster definition; (3) a load balancing; (4) a port configuration; (5) a cipher; (6) a custom driver; or (7) a limit on simultaneous executing threads.

7. A method as defined in claim 1, wherein the first property is automatically identified by accessing the first interface of the first virtual machine during execution of the first virtual machine.

8. A method as defined in claim 1, further including selecting the logical template based on a service provided by the first virtual machine, the executing of the script further including identifying the service provided by the first virtual machine.

9. A method as defined in claim 1, further including scanning the first virtual machine to identify a third virtual machine as being within the application definition.

10. A method as defined in claim 9, wherein the generating of the application definition includes scanning the identified third virtual machine.

11. An apparatus, comprising:
a service analyzer to identify a first virtual machine as being part of an unmanaged application based on a configuration of a second virtual machine;
an application definition generator to generate an application definition of the unmanaged application based on the first virtual machine and the second virtual machine;
a virtual machine analyzer to identify a first property for the first virtual machine by accessing a first interface of the first virtual machine and to identify a second property of the first virtual machine by accessing a second interface of a virtual machine manager corresponding to the first virtual machine;
an application blueprint generator to add a logical template corresponding to the first virtual machine to an application blueprint and to modify the logical template based on the first property and the second property of the first virtual machine; and
an application director to deploy a managed application according to the application blueprint to implement the unmanaged application, at least one of the service analyzer, the application definition generator, the virtual machine analyzer, the application blueprint generator, or the application director being implemented by a processor.

12. An apparatus as defined in claim 11, wherein the virtual machine analyzer is to identify the first property by identifying a configuration item in the first virtual machine and translating the configuration item to the first property.

13. An apparatus as defined in claim 12, wherein the virtual machine analyzer is to identify the first property by executing a discovery script to access data from the first virtual machine.

14. An apparatus as defined in claim 11, wherein the virtual machine analyzer is to identify a service provided by the first virtual machine, and the application blueprint generator is to select the logical template to represent the service provided by the first virtual machine.

15. An apparatus as defined in claim 11, wherein the service analyzer is to scan the first virtual machine and identifying a third virtual machine based on the scanning, the application definition generator to generate the application definition based on the third virtual machine.

16. A tangible computer readable storage medium comprising machine readable instructions which, when executed, cause a logic circuit to at least:
generate an application definition of an unmanaged application by identifying a first virtual machine as being part of the unmanaged application based on a configuration of a second virtual machine;
automatically identify a first property for the first virtual machine by accessing a first interface of the first virtual machine and to automatically identify a second property of the first virtual machine by accessing a second interface of a virtual machine manager corresponding to the first virtual machine;
add a logical template corresponding to the first virtual machine to an application blueprint and modifying the logical template based on the first property and the second property of the first virtual machine; and
deploy a managed application according to the application blueprint to implement the unmanaged application.

17. A storage medium as defined in claim 16, wherein the instructions are to cause the logic circuit to deploy the managed application by deploying a third virtual machine based on the application blueprint.

18. A storage medium as defined in claim 16, wherein the first property of the first virtual machine includes a middleware setting.

19. A storage medium as defined in claim 16, wherein the instructions are to cause the logic circuit to identify the first property by identifying a configuration item in the first virtual machine and translating the configuration item to the first property.

20. A storage medium as defined in claim 19, wherein the instructions cause the logic circuit to identify the configuration item by executing a discovery script to access data from the first virtual machine.

21. A storage medium as defined in claim 19, wherein the configuration item includes at least one of: (1) a dependency between the first virtual machine and at least one of (a) a third virtual machine, (b) a service, or (c) another application component in the unmanaged application; (2) a node cluster definition; (3) a load balancing; (4) a port configuration; (5) a cipher; (6) a custom driver; or (7) a limit on simultaneous executing threads.

22. A storage medium as defined in claim 16, wherein the instructions cause the logic circuit to automatically identify the first property by accessing the first interface of the first virtual machine during execution of the first virtual machine.

23. A storage medium as defined in claim 16, wherein the instructions are further to cause the logic circuit to select the logical template based on a service provided by the first virtual machine, the executing of the script further including identifying the service provided by the first virtual machine.

24. A storage medium as defined in claim 16, wherein the instructions are further to cause the logic circuit to scan the first virtual machine to identify a third virtual machine as being within the application definition.

25. A storage medium as defined in claim 24, wherein the instructions are to cause the logic circuit to generate the application definition by scanning the identified third virtual machine.

* * * * *